Feb. 15, 1966     C. DREYER ET AL     3,235,344

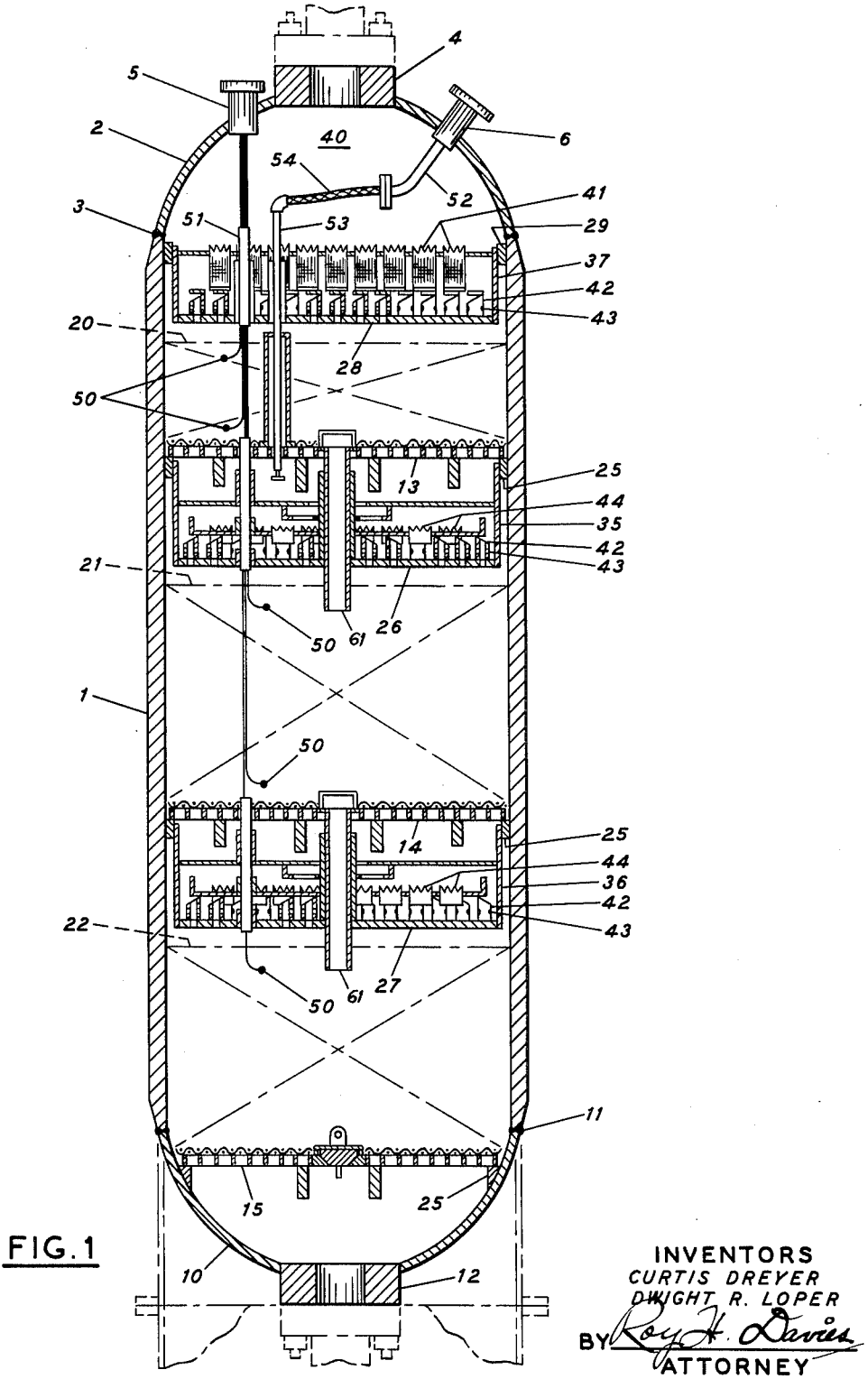

HYDROCARBON CONVERSION CATALYTIC REACTOR

Filed Feb. 18, 1963     2 Sheets-Sheet 2

INVENTORS
CURTIS DREYER
DWIGHT R. LOPER
BY Roy H. Davis
ATTORNEY

United States Patent Office 3,235,344
Patented Feb. 15, 1966

3,235,344
HYDROCARBON CONVERSION CATALYTIC
REACTOR
Curtis Dreyer, Oakland, and Dwight R. Loper, Lafayette,
Calif., assignors to Chevron Research Company, a corporation of Delaware
Filed Feb. 18, 1963, Ser. No. 259,036
1 Claim. (Cl. 23—289)

*Introduction*

The present invention relates to hydrocarbon conversion reactors and more particularly to reactors having internals supported from a plurality of points on the interior of the reactor shell.

*Prior art*

It is well known that a hydrocarbon conversion reactor shell comprises a metal alloy that is susceptible to failure by cracking, and that small or incipient cracks that develop in the shell can rapidly propagate to an extent that the reactor fails. This is a particularly serious problem in hydrofining and hydrocracking reactors that operate at considerable pressure.

It is known that reactor shells may be of the unclad or clad varieties. Clad reactors are used to combat corrosion of the reactor shell during reactor operation. In such reactors a corrosion-resistant coating or cladding material, for example stainless steel in the case where the shell is chrome steel, is integrally bonded to the interior surface of the shell, by such techniques as roll cladding, strip lining, weld overlay cladding, etc., so that the cladding material will take the brunt of the corrosive attack of the corrosive gases. Although such bonding techniques themselves cause slight additional hazards other than corrosion, particularly in that the cladding material and the shell generally have different coefficients of expansion so that each is impeded by the other in expanding and contracting freely in response to thermal changes, thereby producing some localized material stresses, such stresses are minimal compared with stresses that are caused in prior art reactor shells by other factors. Accordingly, both clad and unclad prior art reactors are susceptible to about the same extent to shell failure caused by propagation of cracks that can develop in the reactor during reactor operation. To combat such shell failure, prior art reactor shells have been manufactured with a large safety factor, requiring reactor shells to be constructed of relatively thick plates of the expensive metal alloy materials of construction. This large safety factor is clearly reflected in the standards set forth in the ASME Code for Unfired Pressure Vessels.

*Objects*

In view of the foregoing, it is an object of the present invention to provide a hydrocarbon conversion reactor design that renders a clad or unclad hydrocarbon conversion reactor substantially less susceptible to failure from cracks that can develop in the reactor shell during reactor operation. It is a further object of the present invention to provide a hydrocarbon conversion reactor capable of operating at a lower shell safety factor than prior art reactors, without an increase in risk of vessel failure.

The present drawing will best be understood, and further objects and advantages thereof will become apparent, from the following description when read in connection with the accompanying drawing, in which:

FIG. 1 is a sectional elevation view of an embodiment of a hydrocarbon conversion reactor constructed in accordance with the present invention and suitable for carrying out the process of the invention;

*Statement of invention*

Figure 3:
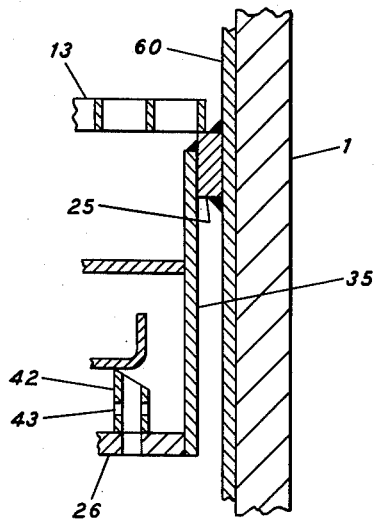
FIG. 3 is an embodiment of expansion hangars for reactor internals and means for supporting said internals to the interior of a clad reactor shell.

In accordance with the present invention there is provided a hydrocarbon conversion catalytic reactor comprising a reactor shell having a smooth exterior surface unbroken by process line connections, top and bottom heads attached to said shell, a hydrocarbon inlet located at said top head, a hydrocarbon outlet located at said bottom head, quench fluid inlet means extending through at least one of said heads for introducing quench fluid into at least two catalyst beds within said shell, means in at least one of said heads for introducing thermocouple connections into said reactor, a plurality of catalyst support trays within said reactor, and structural members in said reactor shell for supporting said trays from a plurality of attachment points on the interior of said reactor shell, said structural members having thermal expansion sections for reducing the mechanical forces transmitted to said rector shell at said attachment points by said structural members during heating and cooling of said structural members.

Further, in accordance with the present invention there is provided a high pressure hydrocarbon conversion reactor comprising:

A. A metal pressure shell, said shell
  (a) Being elongated in a vertical direction,
  (b) Having a continuous exterior surface unbroken process line connections,
  (c) Having a substantially circular cross-section,
B. A top head attached to the top of said shell,
C. A bottom head attached to the bottom of said shell,
D. A hydrocarbon inlet located at said top head,
E. A reaction mix outlet located at said bottom head,
F. Quench fluid inlet means extending through at least one of said heads for introducing quench fluid between at least two catalyst beds within said shell,
G. Means in at least one of said heads for introducing thermocouple connections into said reactor, and
H. A plurality of catalyst support trays within said shell for supporting a plurality of catalyst beds, said shell being in contact with each of said beds around substantially the entire periphery thereof, and providing lateral support for said beds,
I. A plurality of reactor internals support trays within said shell,
J. Means attached to the interior of said shell for supporting said catalyst support trays and said reactor internals support trays from the interior of said shell and for permitting substantial horizontal thermal expansion motion of said catalyst support trays and said reactor internals support trays with respect to said shell, (a) Whereby transmission to said shell of mechanical forces developed by said horizontal thermal expansion is minimized.

*Example of process to which invention is applicable*

While the apparatus of the present invention is useful in many types of hydrocarbon conversion processes, including hydrocracking, hydrofining, and catalytic cracking processes, a process in which the reactor is of particular utility is a hydrofining process wherein hydrocarbon feeds, for example, feeds for subsequent use in a hydrocracking process, are hydrofined for the removal therefrom of such contaminants as nitrogen, sulfur and metals. For purposes of clear understanding of the present invention, one such hydrofining process will be described below.

It will be assumed that it is desired to hydrofine a hydrocarbon feed to a hydrocracking process, and that the hydrocracking process comprises contacting a hydrocarbon feed selected from the group consisting of hydrocarbon distillates boiling above about 200° F. and hydrocarbon residua boiling above about 1050° F. in a hydrocracking zone, in the presence of at least 1000 standard cubic feet (S.C.F.) of hydrogen per barrel of feed, with a catalyst comprising a hydrogenating-dehydrogenating component disposed on an active cracking support at a temperature of from about 400° to 900° F., a pressure of at least 500 p.s.i.g., and a liquid hourly space velocity (LHSV) of about from 0.1 to 15.0, and withdrawing from said zone at least one normally gaseous fraction and at least one normally liquid hydrocarbon product fraction. In such a hydrocracking process, the feed, as defined, may include heavy distillates normally defined as heavy straight-run gas oils and heavy cracked cycle oils, as well as conventional fluid catalytic cracker feeds and portions thereof, and the cracked stocks may be obtained from thermal or catalytic cracking of various stocks, including those obtained from petroleum, gilsonite, shale and coal tar.

Particularly where such hydrocracking feeds contain above about 0.3 p.p.m. total nitrogen, and more particularly where they contain above about 10 p.p.m. total nitrogen, it generally is extremely desirable that the feeds first be subjected to a pretreating operation that is relatively selective for the removal of nitrogen compounds. The desired low nitrogen level may be reached, for example, by intimately contacting the feed stocks with various acidic media, such as $H_2SO_4$ or other liquid acids, or, in the case of feeds that are relatively low in nitrogen compounds, with such solid acidic materials as acid ion exchange resins and the like. However, it is preferred to carry out denitrification by catalytic hydrogenation (hydrofining) of the feed.

A representative hydrofining operation, for purposes of this example, is as follows:

The hydrocarbon feed is contacted at temperatures of from about 400° to 900° F., preferably from about 500° to 800° F., pressures of at least 300 p.s.i.g., liquid hourly space velocities of from about 0.3 to 5.0, along with at least 500 s.c.f. of hydrogen per barrel of feed, with a sulfur-resistant hydrogenation catalyst. Any of the known sulfactive hydrogenation catalysts may be used in the hydrofining pretreatment. The preferred catalysts have as their main active ingredient one or more oxides or sulfides of the transition metals, such as cobalt, molybdenum, nickel and tungsten. These various materials may be used in a variety of combinations with or without such stabilizers and promoters as the oxides and carbonates of K, Ag, Be, Cu, Mg, Ca, Sr, Ba, Ce, Bi, Cr, Th, Si, Al and Zr. These various catalysts may be unsupported or disposed on various conventional supporting materials, for example charcoal, fuller's earth, kieselguhr, silica gel, alumina, bauxite, and magnesia. While any of the noted classes of conventional sulfactive hydrogenation catalysts may be employed, it has been found that particularly desirable catalysts are: (1) a molybdenum oxide catalyst promoted by a minor amount of cobalt oxide and supported upon an activated alumina; (2) tungsten sulfide on activated alumina; and (3) a molybdenum sulfide catalyst promoted by a minor amount of nickel sulfide supported on activated alumina. The catalyst may be in the form of fragments or formed pieces, such as pellets, extrudates and cast pieces of any suitable form or shape.

An effective hydrofining catalyst comprises cobalt impregnated on a coprecipitated molybdenum-alumina (e.g., prepared in accordance with the disclosures of U.S. Patent 2,432,286 to Claussen et al., or U.S. Patent 2,697,006 to Sieg), combined with cobalt oxide, the final catalyst having a metals content equivalent to about 2% cobalt and 7% molybdenum.

Operable hydrofining conditions are temperatures of 700° to 800° F., pressures of 200 to 3000 p.s.i.g., space velocities of 0.5 to 3.0, and 1000 to 15,000 s.c.f. of hydrogen per barrel of hydrocarbon feed.

*Construction and operation*

Referring now to FIG. 1, there shown is a sectional elevational view of an embodiment of a hydrocarbon conversion reactor constructed in accordance with the present invention, and suitable for carrying out a hydrofining or hydrocracking process. The reactor illustrated comprises a chromium alloy steel shell 1 containing, for example, 2¼ weight percent chromium and 1 weight percent molybdenum. Reactor shell 1 is fitted as shown with a top head 2 welded to reactor shell 1 by weld 3. Top head 2 is fitted with a hydrocarbon inlet 4, process connection 5 for installation of thermocouples, process connection 6 for installation of quench gas pipes, and with any other process connections necessary or desirable for establishing communication between the exterior and interior of reactor shell 1. Reactor shell 1 also is fitted with bottom head 10 welded to reactor shell 1 by weld 11. Bottom head 11 is fitted as shown with a reaction mix outlet 12, communicating as shown with the reaction space or interior of reactor shell 1.

It will be noted that reactor shell 1 has a smooth exterior surface unbroken by any process line connections. In prior art reactors of the present type, process line connections invariably or at least generally are installed in the reactor shell as well as in the headers.

Catalyst support trays 13, 14 and 15 are attached to the interior of reactor shell 1 as shown so that the entire load of the catalyst supported on said trays to the heights shown by lines 20, 21 and 22, as well as the entire load of trays 26 and 27 and reactor internals carried thereby are supported by members 25 which are attached to reactor shell 1 as shown. Similarly, the entire load of tray 28, together with the associated reactor internals carried by tray 28, is supported from member or members 29, attached to reactor shell 1.

Trays 13, 14 and 15 are slidably located on members 25 as shown so that they may thermally expand without transmitting mechanical forces to reactor shell 1. Tray 26 is supported from member 25 through a thermal expansion member 35, which flexes in response to thermal expansion of tray 26, thereby reducing the mechanical forces transmitted from tray 26 to member 25 and thence to reactor shell 1. Thermal expansion member 36 operates in a similar manner with respect to tray 27, and thermal expansion member 37 operates in a similar manner with respect to tray 28.

The arrangement of reactor internals shown is an arrangement that is satisfactory, for purposes of illustrating the present invention, in connection with a hydrodenitrification process of the type previously discussed. In such a process, the nitrogen-containing hydrocarbon feed together with hydrogen, is passed through reactor inlet 4 into space 40, thence through basket means 41, which serve to screen out fine solids and distribute the feed, thence through pipes 42 into contact with the catalyst mass located on support grid 13. Pipes 42 are located on tray 28, having perforations coinciding with the vertical holes in pipes 42. Reaction mix passes longitudinally through pipes 42, while liquids which collect on tray 28 rise to the height of the holes 43, and then flow through holes 43 into pipes 42.

Reaction mix is passed through support grid 13 and thence through a further reactor internal including quench trays and additional downcomer trays 44 and pipes 42 located on tray 26 to a second catalyst bed located on support grid 14. Reaction mix from said second catalyst bed in turn passes through further reactor internals including quench trays and additional downcomer trays 44 and pipes 42 located on tray 27 to a third catalyst bed located on support grid 15. From said third catalyst bed, reaction mix, including ammonia formed the hydrodenitrification reaction, passes out of the reactor through reactor outlet 12.

Thermocouples 50 are installed in the catalyst beds as shown and extend upwardly through tubes 51 to measuring instruments located outside of the reactor. Pipes 52 and 53, connected by flexible conduit 54 may be installed as shown for the purpose of introducing quench gas between one or more sets of catalyst beds.

Catalyst pipes 61 are installed in the catalyst beds as shown in order to facilitate addition and removal of catalyst.

Referring now to FIGS. 2, 3, 4 and 5, there shown are various embodiments of reactor internals, including trays, comprising means for supporting said internals to the interior of clad and unclad reactor shells in a manner permitting thermal expansion of said internals with a minimum transmission of mechanical forces to said shells. The discussion of each of said figures applies equally to all of the corresponding trays and reactor internals shown in FIG. 1; however, to simplify the following discussion, only trays 13 and 26, together with some other reactor internals associated therewith will be discussed below.

Figure 2:
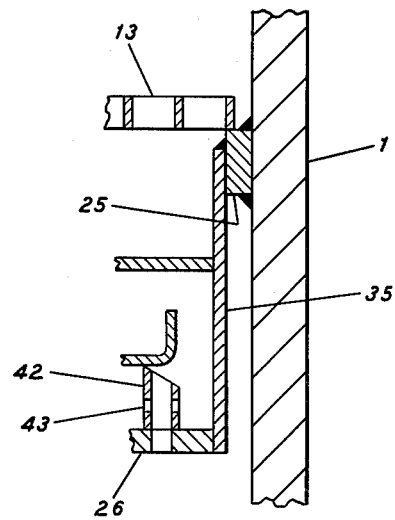
FIG. 2 is an embodiment of reactor internals, including trays, comprising means for supporting said internals to the interior of an unclad reactor shell in a manner permitting thermal expansion of said internals with a minimum transmission of mechanical forces to said shell.

Referring now to FIG. 2, there shown is an embodiment of reactor internals in accordance with the present invention, used in conjunction with an unclad reactor shell. Support member 25, which may be a plurality of separate members spaced around the interior of the reactor of a shell annular shaped ledge, is welded to the interior of reactor shell 1 as shown. Tray 13 slidably rests on member or members 25 as shown in a manner permitting horizontal thermal expansion of tray 13 unimpeded by reactor shell 1. Tray 26, comprising pipe 42, is supported from member or members 25 via elongated thermal expansion member 35, which may be welded to member or members 25 as shown, and which flexes in response to horizontal thermal expansion of tray 26, and therefore which transmits to reactor shell 1 from tray 26 a minimum of mechanical forces developed by said horizontal expansion of tray 26. It will be seen that the arrangement shown reduces local stress concentrations in reactor shell 1 that are produced by mechanical forces generated by thermal expansion of the reactor internals.

Referring now to FIG. 3, there shown is an embodiment of reactor internals in accordance with the present invention, used in conjunction with a clad reactor shell. In the embodiment shown the various numbered elements are the same as those shown in FIG. 2, and coact in the same manner as those shown in FIG. 2 except that to reactor shell 1 is bonded a continuous cladding material 60, to which member or members 25 are welded.

Figure 4:
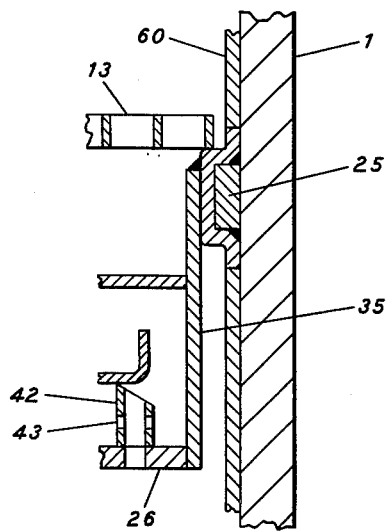
FIG. 4 is a further embodiment of expansion hangars for reactor internals and means for supporting said internals to the interior of a clad reactor shell.

Referring now to FIG. 4, there shown is an embodiment of reactor internals in acordance with the present invention, used in conjunction with a clad reactor shell. In the embodiment shown the various numbered elements are the same as those shown in FIG. 3, and coact in the same manner as those shown in FIG. 3, except that member or members 25 are welded directly to the interior of reactor shell 1, cladding material 60 is shaped as shown to cover member or members 25, and the reactor internals are in contact with the shaped portion of cladding material 60 as shown instead of being in contact with member or members 25. In the embodiment shown cladding material 60 is not continuous; rather the shaped portion thereof that covers member or members 25 is separate from the portions above and below said shaped portion, as shown.

Figure 5:
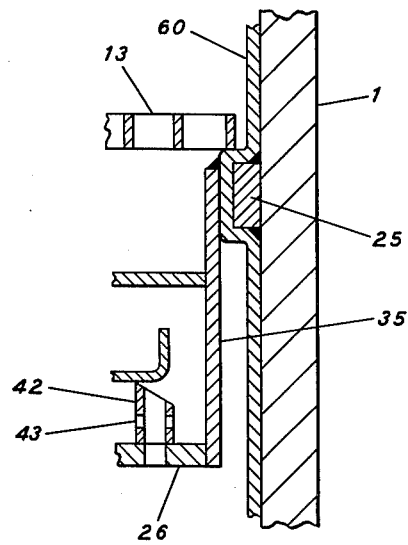
FIG. 5 is a further embodiment of expansion hangars for reactor internals and means for supporting said internals to the interior of a clad reactor shell.

Referring now to FIG. 5, there shown is an embodiment of the present invention that exactly corresponds in elements and element coaction with the embodiment shown in FIG. 4, except that cladding material 60 is continuous above, across, and below member or members 25, rather than being in separating portions as in FIG. 4.

From the foregoing, it may be seen that, with the apparatus of the present invention, stress concentrations in reactor shell 1 may be minimized to the greatest possible extent, thereby permitting a reactor to be manufactured with a much lower safety factor, and therefore with considerably less of the expensive metal alloys used in reactor shell construction.

It has been found in actual reactor design that in reactors constructed as aforesaid, the safety factor may be reduced to from two-thirds to three-fourths of the safety factor required by the ASME Code for Unfired Pressure Vessels, without increasing the risk of vessel failure. It will be appreciated that with this lower safety factor, large savings in weight of construction materials can be made. Because weight limitations in the reactor are governed primarily by shipping feasibility, a reduction in weight for a given size reactor means that the reactor can be made larger. Accordingly, in various individual installations this can mean, for example, that two larger reactors can be used instead of three smaller ones; this results in a substantial saving in addition to the saving of material costs, because each reactor requires its own auxiliary equipment, and therefore a smaller number of reactors require a smaller amount of auxiliary equipment. The over-all saving can be as much as several thousand dollars in a single hydrofining-hydrocracking reactor installation. That such results are obtainable is entirely unexpected; heretofore the art has not appreciated how such a reduction in materials cost could safely be made, and how the savings attendant on such a reduction could be accomplished. It is entirely unexpected to find that the obtained results are possible by utilizing the following combination of features: (1) a smooth outer reactor shell, unbroken by any process lines or other connections, and top and bottom heads through which all connections are made to the reactor; (2) reactor internals supported from inside of the shell of the unclad reactor, and from the inside of the cladding or the inside of the shell of the clad reactor, on expansion hangers so designed that expansion of the internals from thermal effects will transmit a minimum of forces to the shell that would be capable of setting up stresses therein; (3) a safety factor of from two-thirds to three-fourths of the safety factor required by the ASME Code for Unfired Pressure Vessels.

Although only specific modes of operation of the apparatus and process of the present invention have been described, numerous variations could be made in these modes without departing from the spirit of the invention, and all such variations that fall within the scope of the appended claim are intended to be embraced thereby.

We claim:

A high pressure hydrocarbon conversion reactor comprising:
  (A) a metal pressure shell, said shell
    (a) being elongated in a vertical direction,
    (b) having a continuous exterior surface unbroken by process line connections,
    (c) having a substantially circular cross-section,
  (B) a top head attached to the top of said shell, (C) a bottom head attached to the bottom of said shell,
(D) a hydrocarbon inlet located at said top head,
(E) a reaction mix outlet located at said bottom head,
(F) quench fluid inlet means extending through at least one of said heads for introducing quench fluid between at least two catalyst beds within said shell,
(G) means in at least one of said heads for introducing thermocouple connections into said reactor, and
(H) a plurality of catalyst support trays within said shell for supporting a purality of catalyst beds, said shell being in contact with each of said beds around substantially the entire periphery thereof, and providing lateral support for said beds,
(I) a plurality of reactor internals support trays within said shell,
(J) means attached to the interior of said shell for supporting said catalyst support trays and said reactor internals support trays from the interior of said shell and for permitting substantial horizontal thermal expansion motion of said catalyst support trays and said reactor internals support trays with respect to said shell,
   (a) whereby transmission to said shell of mechanical forces developed by said horizontal thermal expansion is minimized.

References Cited by the Examiner

UNITED STATES PATENTS

| | | | |
|---|---|---|---|
| Re. 23,638 | 3/1953 | Peters | 23—288 |
| 1,949,109 | 2/1934 | Pier et al. | 208—108 X |
| 2,028,348 | 1/1936 | Pier et al. | 208—108 |
| 2,595,384 | 5/1952 | Johnsen et al. | 23—288 |
| 2,632,692 | 3/1953 | Korin et al. | 23—288 |
| 2,660,520 | 11/1953 | Bethea | 23—288 |
| 2,664,347 | 12/1953 | Rehrig | 23—288 |
| 2,690,962 | 10/1954 | Clarke | 23—288 |
| 2,836,902 | 6/1958 | North | 23—288 |
| 2,861,873 | 11/1958 | Worn | 23—289 |
| 3,172,832 | 3/1965 | Dreyer et al. | 23—288 X |

FOREIGN PATENTS

| | | |
|---|---|---|
| 104,555 | 7/1938 | Australia. |
| 328,586 | 4/1936 | Great Britain. |

OTHER REFERENCES

Perry: Chemical Engineers' Handbook, pp. 1237–43, 3rd ed. (1950).

MORRIS O. WOLK, *Primary Examiner.*

J. SCOVRONEK, *Assistant Examiner.*